(12) United States Patent
Moran

(10) Patent No.: US 6,841,898 B2
(45) Date of Patent: Jan. 11, 2005

(54) AUTOMATIC POWER SUPPLY SELECTOR FOR A ACPI-COMPLIANT PCI DEVICES

(75) Inventor: Jon Moran, Round Rock, TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 10/023,578

(22) Filed: Dec. 17, 2001

(65) Prior Publication Data

US 2002/0057019 A1 May 16, 2002

Related U.S. Application Data

(62) Division of application No. 09/610,907, filed on Jul. 6, 2000, which is a division of application No. 09/234,993, filed on Jan. 21, 1999, now Pat. No. 6,091,617.

(51) Int. Cl.$^7$ ............................................. H02J 1/00
(52) U.S. Cl. ............................ 307/80; 307/85; 307/86
(58) Field of Search ............................... 307/80, 85, 86

(56) References Cited

U.S. PATENT DOCUMENTS

| 4,633,159 A | 12/1986 | Sakaue et al. | |
|---|---|---|---|
| 4,843,536 A | 6/1989 | Watanabe | |
| 5,021,679 A | 6/1991 | Fairbanks et al. | |
| 5,103,110 A | 4/1992 | Housworth et al. | |
| 5,297,141 A | 3/1994 | Marum | |
| 5,508,874 A | 4/1996 | Williams et al. | |
| 5,739,597 A | * 4/1998 | Bailey et al. | 307/85 |
| 5,814,977 A | * 9/1998 | Kim | 323/267 |
| 5,929,539 A | 7/1999 | Kozaru et al. | |
| 5,969,438 A | * 10/1999 | Odaohara | 307/80 |
| 5,973,871 A | 10/1999 | Dunn et al. | |
| 6,149,319 A | * 11/2000 | Richter et al. | 395/750.01 |

* cited by examiner

Primary Examiner—Robert DeBeradinis
(74) Attorney, Agent, or Firm—Haynes and Boone, LLP

(57) ABSTRACT

Apparatus for automatically selecting one of two or more available power supply voltages for use as a main power supply of a PCI adapter is described. In one embodiment, a power supply selector is designed such that the presence of a positive voltage at a Vaux input thereof prevents power at a Vcc input thereof from driving a main power supply input to a PCI adapter. Conversely, the absence of a positive voltage at the Vaux results in the main power supply input to the PCI adapter being derived from the Vcc input. In an alternative embodiment, jumpers are provided for enabling a user to select which power supply will be used as the "default" power supply for the adapter.

9 Claims, 1 Drawing Sheet

AUTOMATIC POWER SUPPLY SELECTOR FOR A ACPI-COMPLIANT PCI DEVICES

This application is a Divisional of U.S. Ser. No. 09/610,907 filed on Jul. 6, 2000 which is a Divisional of U.S. Ser. No. 09/234,993 filed on Jan. 21, 1999 now U.S. Pat. No. 6,091,617.

BACKGROUND

The disclosures herein relate generally to Advanced Configuration and Power Interface ("ACPI")-compliant Peripheral Component Interface ("PCI") devices and more particularly to an automatic power supply selector for such devices.

In early 1997, Intel Corporation, Microsoft Corporation, and Toshiba America Information Systems Inc. published an open specification to bring easy, flexible power management to a broad array of personal computer ("PC") products, including servers, business systems, and desktop and portable computers. The new specification, known as the Advanced Configuration and Power Interface Specification ("ACPI") version 1.0, enables PCS to come on instantly when accessed by a user and to remain available to perform automated tasks after they are turned off. ACPI enhances power management in PCS to provide a low-power sleep state that can be used instead of turning the PC off. ACPI also enables PCS to turn on and off peripherals such as CD-ROMs, network cards, hard disk drives and printers, as well as consumer electronics connected to a PC, such as VCRs, TVS, phones and stereos. Using ACPI, connected devices in turn will be able to activate the PC, making it easier for users to perform automated tasks and to integrate PCS into home communications and entertainment centers.

At least one type of motherboard produced by a well-known PC manufacturer does not support ACPI, but does provide a +3.3 volt power supply at a Vaux pin of each PCI adapter slot for connecting PCI devices to a PCI bus thereof, in addition to main power supply pins, defined as Vcc. The Vaux pin is defined as pin A14 in the PCI Local Bus Specification, PCI Special Interest Group, Rev. 2.1 (1995) (hereinafter "PCI 2.1 specification"), which is hereby incorporated by reference in its entirety. The Vaux pin along with a control pin A19, which is defined as PME#, are required for designs whether they are ACPI-compliant or not.

An extreme case, which should be supported by every motherboard, is where both Vaux and Vcc are supplied to a PCI device. In this case, the two power supplies should never be connected together.

Therefore, what is needed is a device for automatically switching between available power supply voltages depending upon the presence or absence of an auxiliary power supply.

SUMMARY

One embodiment, accordingly, provides an apparatus for automatically selecting one of two or more available power supply voltages for use as a main power supply of a PCI adapter. In one embodiment, a power supply selector is provided such that the presence of a positive voltage at a Vaux input thereof prevents power at a Vcc input thereof from driving a main power supply input to the PCi adapter. Conversely, the absence of a positive voltage at the Vaux input results in the main power supply input to the PCI adapter being derived from the Vcc input.

An alternative embodiment enables a user to select, via jumper settings, whether Vcc or Vaux will be used as the "default" power supply.

A technical advantage achieved with the power supply selector is that it prevents both Vcc and Vaux from being simultaneously provided to a PCI adapter.

DESCRIPTION OF A PREFERRED EMBODIMENT

Figure 1:
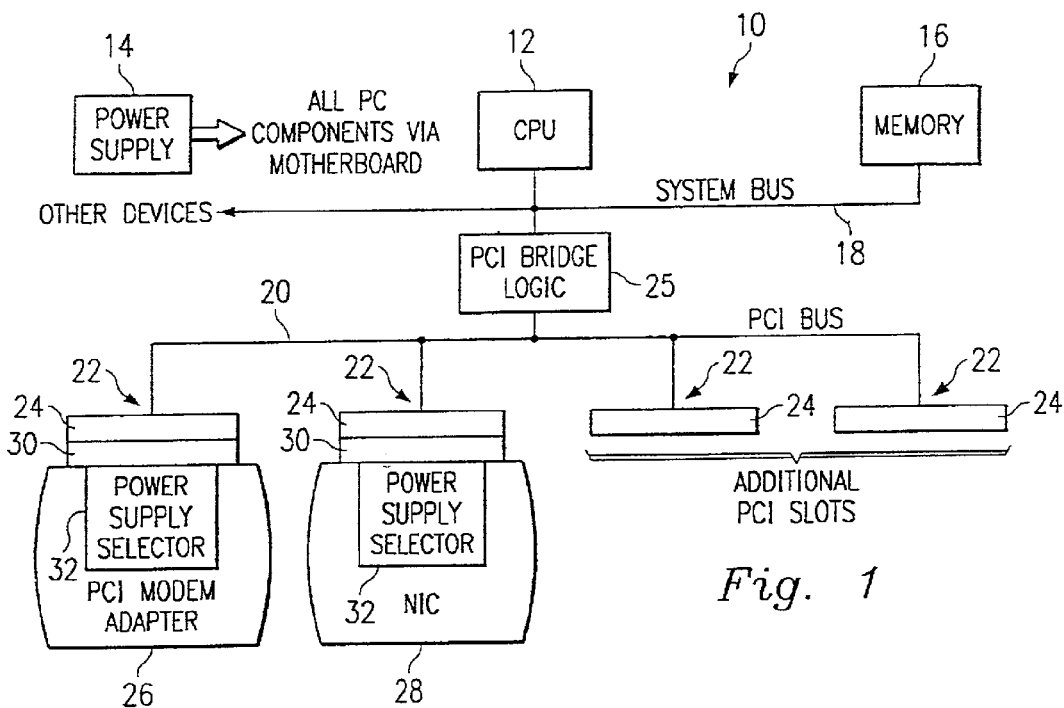
FIG. 1 is a system block diagram of a computer system embodying features of one embodiment of a power supply selector.

FIG. 1 is a block diagram of a computer system 10 embodying features of a power supply selector of one embodiment. As shown in FIG. 1, the computer system 10 includes a CPU 12 connected to memory 16 and other devices and/or buses (not shown) via a system bus 18. A power supply 12 is provided for providing power to the various devices of the computer system 10 in a conventional manner via a connector on a motherboard (not shown) of the system 10. A PCI bus 20, including a plurality of PCI slots 22 each having a PCI slot connector 24, is connected to the system bus 18 via appropriate bridge logic 25. For purposes of illustration, a PCI modem adapter 26 and a network interface card ("NIC") 28 are shown as being connected to the PCI bus 20 via respective PCI slots 22 and complementary connectors 30, although it will be recognized that the embodiments described herein will be applicable to a variety of ACPI-compliant devices. Each of the PCI modem adapter 26 and the PIC 28 include power selector logic 32 adapter for purposes that will be described in greater detail below with reference to FIG. 2.

In a preferred embodiment, all illustrated components other than the power supply 14 reside on a motherboard (not shown) of the computer 10.

Figure 2:
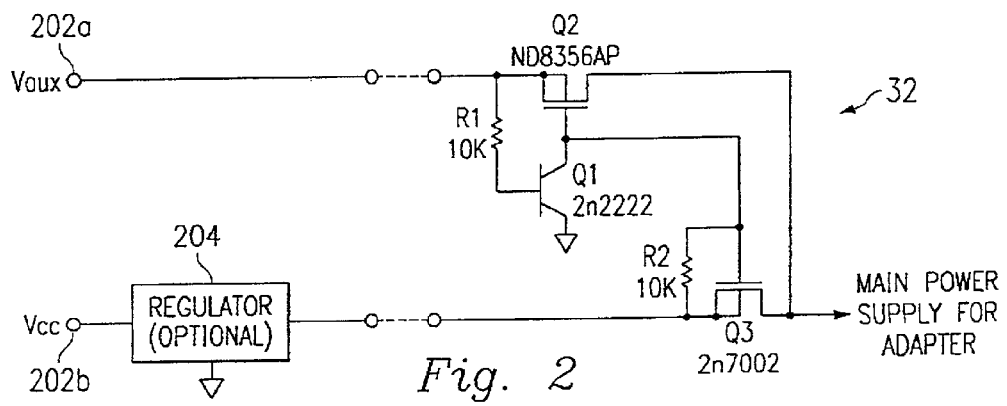
FIG. 2 is a schematic diagram of the power supply selector of FIG. 1.

FIG. 2 is a schematic diagram of the power supply selector 32 in accordance with a preferred embodiment. A Vaux input 202a and a Vcc input 202b of the power supply selector 32 are respectively connected, via corresponding pins of the connectors 24, 30, to receive Vaux (approximately +3.3 volts) and Vcc (approximately +5.0 volts) from the power supply 14 (FIG. 1). As shown in FIG. 2, the presence of a positive voltage at the Vaux input 202a turns a first transistor Q1 ON, which in turn turns a second transistor Q2 ON. In addition, when Q1 is ON, a third transistor Q3 is OFF, thus preventing power from the Vcc input 202b from driving Vaux, which supplies the main power for a PCI adapter (not shown).

In contrast, the absence of a positive voltage at the Vaux input 202a results in transistor Q1 being OFF, thereby turning the transistor Q2 OFF and the transistor Q3 ON. As a result, power is prevented from being supplied to the PCI adapter via the Vaux input 202a and the main power therefor is supplied via the Vcc input 202b. As shown in FIG. 2, an optional regulator 204 may be included for regulating Vcc prior to its being provided to the transistor Q3.

For ACPI compliance, PME# circuitry of the PCI adapter will be driven off the main power supply to the PCI adapter, due to the fact that PME# needs power regardless of whether Vaux is present.

As the foregoing discussion clearly demonstrates, any time Vaux is present at the Vaux input 202a, it will be used as the main power supply to the PCI adapter; in its absence, Vcc will be used. Accordingly, the power supply selector 32 prevents the PCI adapter from being simultaneously connected to both Vaux and Vcc.

It will be recognized that the voltages applied at the Vaux input 202a and the Vcc input 202b could be reversed, with +5 volts applied at the input 202a and +3.3 volts applied at the input 202b, if it is desirable to have +5 volts be the default voltage level.

Figure 3:
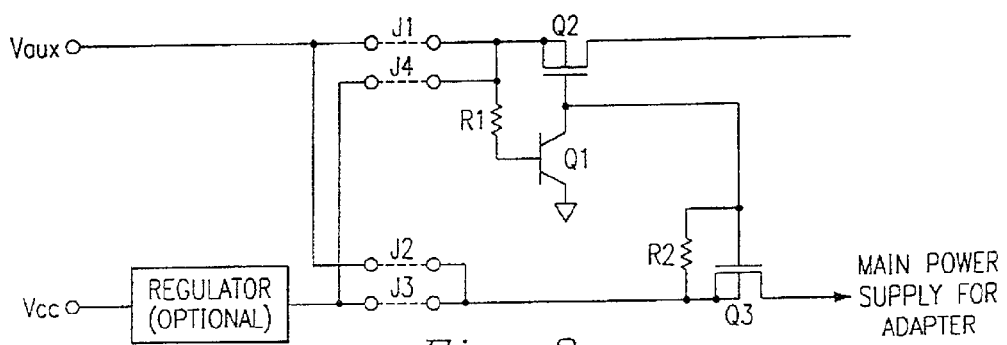
FIG. 3 is a schematic diagram of an alternative embodiment of the power supply selector of FIG. 1

FIG. 3 is a schematic diagram of an alternative embodiment 32' of the power supply selector 32. The power supply selector 32' is identical in all respects to the power supply selector 32, except that, as described in greater detail below, jumpers J1, J2, J3, and J4, are provided for enabling a user to select which power supply (i.e., Vcc or Vaux) will be used as the default power supply. In contrast, the power supply 32 is configured such that Vaux is always the default power supply.

Referring to FIG. 3, it will be recognized that if jumpers J1 and J3 are set, Vaux will be used as the default power supply; in contrast, if jumpers J2 and J4 are present, or set, Vcc will be used as the default power supply.

Although illustrative embodiments have been shown and described, other modifications, changes, and substitutions are intended in the foregoing disclosure. Accordingly, it is appropriate that the appended claims be construed broadly and in a manner consistent with the scope of the disclosure.

What is claimed is:

1. An adapter card system including means for selecting between two different voltages for use by an adapter card as a main power supply voltage, comprising:
   a bus;
   a first card, including a power selector logic, connected to the bus; and
   a second card, including a power selector logic, connected to the bus;
   the power selector logic including:
      a first switch connected to a first input;
      a second switch connected between the first input and an output and further connected to the first switch;
      a third switch connected between a second input and the output and further connected to the first and second switch;
      a first voltage present at the first input; and
      a second voltage present at the second input.

2. The adapter card system of claim 1 wherein the adapter card is a PCI adapter.

3. The adapter card system of claim 1 wherein the first voltage is less than the second voltage.

4. The adapter card system of claim 1 wherein the first voltage is +3.3 volts and the second voltage is +5 volts.

5. The adapter card system of claim 1 wherein the first voltage is +5 volts and the second voltage is +3.3 volts.

6. The adapter card system of claim 1 further comprising means for regulating the second voltage.

7. The adapter card system of claim 1 further comprising:
   means responsive to the first voltage being present at the first input including at least one transistor.

8. The adapter card system of claim 1 further comprising:
   means responsive to the voltage not being present at the first input including at least one transistor.

9. An adapter card system including means for selecting between two different voltages for use by an adapter card as a main power supply voltage, comprising:
   a bus;
   a first card, including a power selector logic, connected to the bus; and
   a second card, including a power selector logic, connected to the bus;
   the power selector logic including:
      a first switch connected to a first input;
      a second switch connected between the first input and an output and further connected to the first switch; and
      a third switch connected between a second input and the output and further connected to the first and second switch;
   wherein when a first voltage is present at the first input, the first and second switches are in a conductive state and the third switch means is in a nonconductive state, such that only the first voltage is provided at the output; and
   wherein when the first voltage is not present at the first input, the first and second switches are in a nonconductive state and the third switch is in a conductive state, such that a second voltage applied at the second input is provided at the output.

* * * * *

UNITED STATES PATENT AND TRADEMARK OFFICE
CERTIFICATE OF CORRECTION

PATENT NO. : 6,841,898 B2
DATED : January 11, 2005
INVENTOR(S) : Jon Moran

It is certified that error appears in the above-identified patent and that said Letters Patent is hereby corrected as shown below:

Title page,
Item [54], Title, after "FOR" and before "ACPI-COMPLIANT," please delete "A".

Signed and Sealed this

Twenty-sixth Day of April, 2005

JON W. DUDAS
*Director of the United States Patent and Trademark Office*